United States Patent Office 3,155,639
Patented Nov. 3, 1964

3,155,639
POLYMERS OF ACRYLATES AND METHACRYLATES OF BICYCLIC PHOSPHITES AND BICYCLIC PHOSPHATES
William D. Emmons, Huntingdon Valley, and William S. Wadsworth, Jr., Willow Grove, Pa., assignors to Rohm & Haas Company, Philadelphia, Pa., a corporation of Delaware
No Drawing. Original application Jan. 19, 1961, Ser. No. 83,613. Divided and this application Mar. 14, 1962, Ser. No. 179,801
7 Claims. (Cl. 260—80.5)

This application is a division of Serial No. 83,613, filed January 19, 1961.

This invention relates to compounds of Formula I:

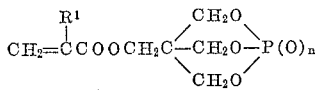

wherein $R^1$ is a methyl group or a hydrogen atom, and
$n$ is an integer from 0 to 1.

Typical of the valuable compounds of the invention are the following:

Methacryloxymethyl bicyclic phosphite
Acryloxymethyl bicyclic phosphite
Methacryloxymethyl bicyclic phosphate
Acryloxymethyl bicyclic phosphate The bicyclic phosphates and phosphites of this invention are valuable monomers which are polymerizable to form useful polymers. The bicyclic phosphites and phosphates are also pesticides. The polymers are useful as coatings, as additives to lubricating oils and in various other applications.

The bicyclic phosphites of the invention can be prepared by a number of convenient methods. A preferred method of preparation comprises reacting the bicyclic phosphites of Formula II:

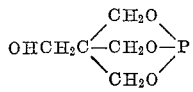

with a compound of Formula III:

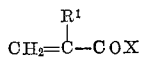

wherein $R^1$ is defined above, and X is a halogen atom, such as bromine and preferably chlorine.

The reaction between the compound of Formula II and Formula III is spontaneous and exothermic. The reaction is preferably performed in the presence of an inert organic solvent. Examples of useful solvents include benzene, toluene, xylene, acetone, methylethyl ketone, diethyl ketone, ethyl acetate, and mixtures of such solvents.

The temperature may vary from −30° C. to 50° C. or over, but it is much preferred, especially when high yields are desired, to maintain the temperature in the range from −20° C. to 10° C.

During the reaction between Compounds II and III, it is preferable to use a base acceptor to take up the hydrogen halide liberated. Useful for such purposes are organic bases, such as an amine like pyridine, triethylamine, or an inorganic base like sodium hydroxide, sodium carbonate, sodium bicarbonate, or lime; or basic reacting salts like sodium acetate. In the reaction between Compounds II and III, it is quite satisfactory to employ stoichiometric amounts of the two compounds, although greater or smaller amounts may be employed if desired.

For best results, it is also desirable to employ a polymerization inhibitor, such as hydroquinone and other equivalent acrylate and methacrylate inhibitors. The use of an inhibitor is especially recommended when temperatures over 25° C. are employed. After the reaction is completed, the reaction medium is filtered and the product is obtained by removal of solvent, preferably under reduced pressure.

The bicyclic phosphates of the invention can readily be prepared from the bicyclic phosphite by oxidation thereof. The method of preparation of the phosphates comprises oxidizing the phosphites, preferably in solution, with an oxidizing agent, preferably in stoichiometric amount. As oxidizing agents, there may be used any of the typical organic peroxides, such as hydrogen peroxide, benzoyl peroxide, acetyl peroxide, t-butyl hydroperoxide, methyl ethyl ketone peroxide, and the like; oxidizing peracids such as peracetic acid, perbenzoic acid, performic acid and equivalent oxidizing agents.

Since the oxidation of the bicyclic phosphite is an exothermic reaction, it is advisable to keep the temperature preferably below 80° C., such as in the range of 10° to 50° C. The reaction is terminated when the exotherm subsides.

Suitable solvents in which the bicyclic phosphites may be dissolved during the oxidation reaction include a wide variety of organic solvents, such as lower hydrocarbon solvents of aliphatic, naphthenic or aromatic type, such as benzene, toluene, xylene, mineral spirits, ethers, ketones, such as acetone, methyl ethyl ketone, dioxane and tetrahydrofuran; esters such as ethyl, butyl and amyl acetates, and ethoxyethyl acetate; chlorinated hydrocarbons, such as carbon tetrachloride, chloroform and ethylene dichloride, and the like.

The compounds of the invention are useful in numerous applications. They are valuable pesticides; they are effective bactericides, fungicides and insecticides. The compounds are monomers which are polymerizable by themselves to form homopolymers or, even more advantageously, with other ethylenically unsaturated compounds, such as polymerizable vinylidene compounds to form valuable linear copolymers.

Typical of the polymerizable vinylidene or monoethylenically unsaturated compounds that may be employed to produce copolymers include: vinyl ethers, such as vinyl methyl ether, vinyl butyl ether, vinyl octyl ether, vinyl dodecyl ether, or vinyl stearyl ether; allyl ethers, such as allyl butyl ether, allyl vinyl ether, allyl octyl ether, or allyl decyl ether; acrylates, such as methyl acrylate, ethyl acrylate, butyl acrylate, octyl acrylate, or stearyl acrylate; methacrylates, such as methyl methacrylate, ethyl methacrylate, butyl methacrylate, or octyl methacrylate; acrylamides or methacrylamides, such as methyl acrylamide, methyl methacrylamide, butyl acrylamide, or butyl methacrylamide; vinyl esters such as vinyl acetate, vinyl butyrate, or vinyl stearate; allyl esters, such as allyl butyrate, allyl palmitate, or allyl stearate; maleates such as butyl maleate, octyl maleate, or dodecyl maleate; itaconates, such as octyl itaconate, dodecyl itaconate, or octadecyl itaconate; styrenes, such as styrene or vinyl toluene, or maleic anhydride, acrylonitrile, or the like.

The amount of compounds of Formula I in the copolymers of this invention may be widely varied, amounts in the range of 5 to 95% yielding highly satisfactory results. The remainder may comprise one or more of other copolymerizable vinylidene or monoethylenically unsaturated compounds previously mentioned. Preferred copolymers are those comprising from 5 to 20 mole percent of at least one monomer of Formula I. A preferred group of comonomers comprise the alkyl esters of acrylic and methacrylic acid having from 1 to 18 carbon atoms in the alkyl group. Increasing the proportion of methacrylic and/or acrylic acids in the polymers promotes the solubility of the monomers of the invention. Apparently by virtue of the presence of the phosphate or phosphite groups in the monomer, the polymers exhibit a combination of unusual and beneficial properties.

The homopolymerization or the copolymerization of the compounds of Formula I may be conducted as a bulk, solution or dispersion process, as desired. It is preferable that the polymerization be conducted in the range of 0° to 125° C. or higher. Preferably, a polymerization initiator is used, such as one or more of the peroxidic or the azo initiators, which act as free radical catalysts. Typical organic peroxides include benzoyl peroxide, acetyl peroxide, p-menthane hydroperoxide, and the like; typical azo catalysts include azodiisobutyronitrile, dimethyldiazoisobutyronitrile and azodiisobutyramide. In aqueous systems, ammonium, sodium or potassium persulfates are also convenient alone or in combination with an organic peroxide.

The polymer or copolymer is a viscous or solid product that can be applied from a solution in a thin film to a flat metal, glass or wooden surface.

The following examples are given for purposes of illustration and are not intended as a limitation to the invention. All parts given are by weight.

*Example 1*

Hydroxymethyl bicyclic phosphite, 262.4 parts (1.5 moles), is charged to a two-liter, three-necked, round-bottom flask fitted with a stirrer, thermometer, condenser and dropping funnel. One thousand parts of methylene chloride are added and the mixture stirred until solution is complete. The solution is chilled and 155 parts (1.5 moles) of methacryl chloride is added. To the rapidly stirred solution there are then added 152 parts (1.5 moles) of triethylamine at −20° C. When addition is complete, the mixture is allowed to come to room temperature slowly with rapid stirring. The mixture is suction-filtered and stripped at reduced pressure.

The residue remaining from the stripping is recrystallized from isooctane yielding over an 80% yield of white crystalline methacryloxymethyl bicyclic phosphite of a melting point of 108° C.

*Example 2*

Hydroxymethyl bicyclic phosphite, 262.4 parts (1.5 moles) is charged to a reaction flask with 152 parts of triethylamine and one thousand parts methylene chloride. The temperature is maintained at −10° C. and 135.8 parts of acryl chloride is added with rapid stirring. When the addition is complete, the mixture is allowed to come to room temperature slowly. The mixture is suction filtered and the product is collected by stripping the filtrate at 20 mm. of pressure. A crystalline product is obtained which is acryloxymethyl bicyclic phosphite.

*Example 3*

There are dissolved 24.8 parts of methacryloxymethyl bicyclic phosphite in 75 parts of alcohol; the alcoholic solution is treated with 3.4 parts of a 30% $H_2O_2$ solution while the reaction flask is cooled in an ice bath. Methacryloxymethyl bicyclic phosphate comes out as a precipitate; it is removed by such filtration and recrystallized from ethanol.

*Example 4*

Likewise, from the oxidation of acryloxymethyl bicyclic phosphite with $H_2O_2$, there is obtained acryloxymethyl bicyclic phosphate.

*Example 5*

(*a*) A mixture containing 60 parts methyl methacrylate, 30 parts methacryloxymethyl bicyclic phosphite and 10 parts methacrylic acid was polymerized at 60° C. using a 0.01% azodiisobutyronitrile as a catalyst. There is obtained a clear, hard polymer which exhibits strong adhesion to glass surfaces.

A sample of this polymer was placed in a flame; the polymer charred but did not burn.

(*b*) Another copolymer is obtained by substituting for the methacrylic acid in part (*a*) an equivalent amount of acrylic acid.

(*c*) Another copolymer is obtained by substituting ethyl methacrylate for methyl methacrylate in part (*a*).

(*d*) Another copolymer is obtained from the polymerization of 70 parts of methyl methacrylate, 10 parts of methacrylic acid and 20 parts of methacryloxymethyl bicyclic phosphate.

(*e*) Another copolymer results from substituting 30 parts acryloxymethyl bicyclic phosphate for the methacryloxymethyl bicyclic phosphate in part (*a*).

(*f*) Another copolymer results from the polymerization of 40 parts of acryloxymethyl bicyclic phosphite and methacrylic acid.

(*g*) A homopolymer is obtained by the procedure of part (*a*) by omitting the methyl methacrylate and the methacrylic acid.

*Example 6*

(*a*) A charge comprising 485.1 parts of methyl methacrylate, 202.9 parts of ethyl acrylate, 17.85 parts of methacryloxymethyl bicyclic phosphite, 1.78 parts of benzoyl peroxide, and 53.6 parts of methyl cellosolve is added with stirring in the course of two hours to a glass reaction vessel containing 810.6 parts of toluene. The toluene is maintained at reflux during the addition. The reaction is carried out under an atmosphere of nitrogen.

Two, four, and six hours after the polymerization has started, the reaction is recatalyzed with 0.7 gram of additional benzoyl peroxide while maintaining the temperature at reflux. The heating is continued for a total of eight hours after which time the solution is diluted to approximately 39% resin solids by the addition of toluene. The final resin is a clear viscous solution.

The resin when applied to cold rolled steel gives a film having excellent hardness, adhesion, gloss and flexibility.

(*b*) In a similar manner, there is substituted in part (*a*) methacryloxybicyclic phosphite by an equivalent portion of acryloxymethyl bicyclic phosphite. The clear viscous resinous solution which is obtained is applied onto a steel panel to provide an effective coating.

(*c*) In part (*a*) methacryloxymethyl bicyclic phosphite is substituted by an equivalent proportion of the corresponding phosphate.

(*d*) Likewise, in part (*a*) methacryloxymethyl bicyclic phosphite is substituted by acryloxymethyl bicyclic phosphate.

The polymers and copolymers of the invention are useful as lubricating oil additives, especially for improving the lubricity and the anti-wear properties of the lubricating oils. In such lubricating oils, the polymers of the invention may be incorporated in amounts from about 0.01 to about 10% by weight, preferably 0.1 to 0.25% by weight.

We claim:

1. A copolymer of a compound of the Formula I:

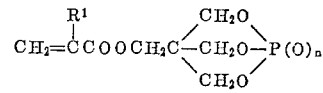

wherein $R^1$ is selected from the group consisting of a methyl group and a hydrogen atom, and $n$ is an integer from 0 to 1, with at least one other copolymerizable monoethylenically unsaturated compound said compound of Formula I being 5 to 95% of the weight of the copolymer, and said copolymer ranging from a viscous liquid to a solid.

2. The polymer of claim 1 in which the monomer is methacryloxymethyl bicyclic phosphite.

3. The polymer of claim 1 in which the monomer is acryloxymethyl bicyclic phosphite.

4. The polymer of claim 1 in which the monomer is methacryloxymethyl bicyclic phosphate.

5. The polymer of claim 1 in which the monomer is acryloxymethyl bicyclic phosphate.

6. A polymer of a compound of claim 1 with at least one other copolymerizable vinylidene unsaturated compound selected from the group consisting of acrylic acid, methacrylic acid, and alkyl esters of these acids.

7. A polymer of a compound of claim 1 with methyl methacrylate and methacrylic acid.

References Cited in the file of this patent
UNITED STATES PATENTS
2,643,261     Matuszak et al. _____ June 23, 1953